United States Patent
Zhang et al.

(10) Patent No.: US 11,871,137 B2
(45) Date of Patent: Jan. 9, 2024

(54) METHOD AND APPARATUS FOR CONVERTING PICTURE INTO VIDEO, AND DEVICE AND STORAGE MEDIUM

(71) Applicant: Lemon Inc., Grand Cayman (KY)

(72) Inventors: Shupeng Zhang, Beijing (CN); Boheng Qiu, Beijing (CN); Peng Wang, Los Angeles, CA (US); Jie Liao, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/089,348

(22) Filed: Dec. 27, 2022

(65) Prior Publication Data

US 2023/0132137 A1    Apr. 27, 2023

Related U.S. Application Data

(63) Continuation of application No. PCT/SG2021/050522, filed on Aug. 30, 2021.

(30) Foreign Application Priority Data

Sep. 30, 2020 (CN) .......................... 202011063249.9

(51) Int. Cl.
*H04N 5/265* (2006.01)
*G06T 7/194* (2017.01)
(Continued)

(52) U.S. Cl.
CPC ............ *H04N 5/265* (2013.01); *G06T 5/002* (2013.01); *G06T 5/003* (2013.01); *G06T 7/194* (2017.01);
(Continued)

(58) Field of Classification Search
CPC .... H04N 5/265; H04N 5/2628; H04N 13/128; H04N 5/272; G06T 5/002; G06T 5/003;
(Continued)

(56) References Cited

U.S. PATENT DOCUMENTS

2005/0220358 A1*  10/2005  Blonde .................. G06T 5/002
                                                          348/576
2010/0111417 A1*   5/2010  Ward ..................... G06T 7/579
                                                          382/173
(Continued)

FOREIGN PATENT DOCUMENTS

CN    103024408 A    4/2013
CN    108616745 A   10/2018
(Continued)

OTHER PUBLICATIONS

International Search Report and Written Opinion issued for Int'l Application No. PCT/SG2021/050522, Int'l Filing Date Aug. 30, 2021, dated Apr. 7, 2022.

*Primary Examiner* — John W Miller
*Assistant Examiner* — Humam M Satti
(74) *Attorney, Agent, or Firm* — ARENTFOX SCHIFF LLP (57) ABSTRACT

A method and apparatus for converting a picture into a video, and a device and a storage medium. The method for converting a picture into a video includes: partitioning an original picture to obtain a foreground region and a background region; performing an iterative transformation for visual depth on the background region, and storing an image obtained through each transformation as a picture frame to obtain multiple frames of images; and splicing the multiple
(Continued)

Partition an original picture to obtain a foreground region and a background region — S110

Perform an iterative transformation for visual depth on the background region, and store an image obtained through each transformation as a picture frame to obtain multiple frames of images; the iterative transformation comprises at least two transformations for visual depth — S120

Splice the multiple frames of images to obtain a target video — S130 frames of images to obtain a target video. The iterative transformation includes at least two transformations for visual depth.

17 Claims, 2 Drawing Sheets

(51) Int. Cl.
    *G06T 5/00*     (2006.01)
    *H04N 5/262*     (2006.01)

(52) U.S. Cl.
    CPC . *H04N 5/2628* (2013.01); *G06T 2207/10016* (2013.01); *G06T 2207/20021* (2013.01); *G06T 2207/20192* (2013.01); *G06T 2207/20212* (2013.01)

(58) Field of Classification Search
    CPC ........... G06T 7/194; G06T 2207/10016; G06T 2207/20021; G06T 2207/20192; G06T 2207/20212; G06T 7/10; G06T 5/00; G06T 7/55; G06T 13/80; G06N 3/02; G06N 20/00
    See application file for complete search history.

(56) References Cited

U.S. PATENT DOCUMENTS

| | | | |
|---|---|---|---|
| 2012/0051625 A1 | 3/2012 | Appia et al. | |
| 2013/0076873 A1 | 3/2013 | Oshikiri | |
| 2017/0085863 A1* | 3/2017 | Lopez | H04N 13/261 |
| 2017/0308990 A1* | 10/2017 | Middleton | G06T 5/005 |
| 2018/0053532 A1* | 2/2018 | Bostick | G11B 27/036 |
| 2018/0139432 A1 | 5/2018 | Barkatullah | |
| 2020/0120349 A1* | 4/2020 | Parois | H04N 19/85 |
| 2021/0400314 A1* | 12/2021 | Varekamp | H04N 21/21805 |

FOREIGN PATENT DOCUMENTS

| | | |
|---|---|---|
| CN | 110262737 A | 9/2019 |
| CN | 110602479 A | 12/2019 |
| CN | 111447428 A | 7/2020 |

* cited by examiner

METHOD AND APPARATUS FOR CONVERTING PICTURE INTO VIDEO, AND DEVICE AND STORAGE MEDIUM

This application is a continuation of International Patent Application No. PCT/SG2021/050522 filed on Aug. 30, 2021, which claims priority to Chinese Patent Application No. 202011063249.9 filed on Sep. 30, 2020, the entire content of which is incorporated herein by reference as a part of this application.

TECHNICAL FIELD

Embodiments of the present disclosure relate to a method for converting a picture to a video, an apparatus thereof, a device, and a storage medium.

BACKGROUND

With continuous popularization of smart devices, a camera function has become an indispensable function in a mobile phone. At present, a photo taken by the mobile phone is only a static picture, which is not very intriguing.

Hitchcock-style mobile zoom technology is applied in film and television works. Through a push-track lens and a zoom lens, a distance change between subject and background is captured to create a visual effect of distortion of the picture and space, which leads an audience into a psychological state of protagonist. The principle of Hitchcock-style mobile zoom technology is: transformation of a focal length in the process of video shooting. On the premise of ensuring that a proportion of the subject in each frame of the video remains unchanged, a switch is made between a telephoto mode and a wide-angle mode; that is, while zooming in or out relative to the subject to be photographed, the lens is zoomed to shoot. This technology generally requires the use of professional shooting equipment to steplessly switch the focal length of the lens during zooming in or zooming out. At present, most of the lenses on mobile terminals are non-zoomable lenses or lenses with several different focal lengths. It is not possible to shoot with Hitchcock-style moving zoom technology, so shooting with Hitchcock-style moving zoom technology has limitations.

SUMMARY

Embodiments of the present disclosure provide a method for converting a picture into a video, an apparatus thereof, a device, and a storage medium, which can implement conversion of a static picture into a dynamic video, and implement focusing of a foreground image and Hitchcock transformation of a background image for album production without manual stop, to improve convenience of album production.

In the first aspect, the embodiments of the present disclosure provide a method for converting a picture into a video, which includes:

partitioning an original picture to obtain a foreground region and a background region;

performing an iterative transformation for visual depth on the background region, and storing an image obtained through each transformation as a picture frame to obtain multiple frames of images; wherein the iterative transformation comprises at least two transformations for visual depth; and splicing the multiple frames of images to obtain a target video.

In the second aspect, the embodiments of the present disclosure provide an apparatus for converting a picture into a video, which includes:

a region obtaining module which is configured to partition an original picture to obtain a foreground region and a background region;

a visual depth transforming module which is configured to perform an iterative transformation for visual depth on the background region, and store an image obtained through each transformation as a picture frame to obtain multiple frames of images; wherein the iterative transformation comprises at least two transformations for visual depth; and a target video obtaining module which is configured to splice the multiple frames of images to obtain a target video.

In the third aspect, the embodiments of the present disclosure provide an electronic device, which includes:

one or more processing apparatuses;

a storage apparatus which is configured to store one or more instructions.

The one or more instructions, when executed by the one or more processing apparatuses, cause the one or more processing apparatuses to implement the method for converting a picture into a video according to the embodiments of the present disclosure.

In the fourth aspect, the embodiments of the present disclosure provide a computer-readable storage medium, which stores a computer program thereon. The program, when executed by a processing apparatus, implements the method for converting a picture into a video according to the embodiments of the present disclosure.

The embodiments of the present disclosure disclose a method for converting a picture into a video, an apparatus thereof, a device, and a storage medium. Firstly, an original picture is partitioned to obtain a foreground region and a background region, then an iterative transformation for visual depth is performed on the background region, and an image obtained through each transformation is stored as a picture frame to obtain multiple frames of images, wherein the iterative transformation includes at least two transformations for visual depth, and finally, the multiple frames of images are spliced to obtain a target video. In the method for converting a picture to a video, multiple images produced by iteratively transforming the visual depth of the image in the background region are spliced to obtain a video album with a focus of the foreground image and a Hitchcock transform effect of the background image without manual stop, which improves the convenience of album production.

DETAILED DESCRIPTION

The embodiments of the present disclosure will be described in more detail below with reference to the accompanying drawings. Although certain embodiments of the present disclosure are illustrated in the accompanying drawings, it should be understood that the present disclosure can be implemented in various forms, and should not be interpreted as limited to the embodiments set forth herein.

Instead, these embodiments are provided for a more thorough and complete understanding of the present disclosure. It should be understood that the accompanying drawings and the embodiments of the present disclosure are only for illustrative purposes, and are not intended to limit the protection scope of the present disclosure.

It should be understood that various steps described in the method implementations of the present disclosure may be executed in different orders and/or in parallel. Furthermore, the method implementations may include additional steps and/or omit execution of the steps shown. The scope of the present disclosure will not be limited in this regard.

The term "including" and variants thereof used herein are open including, that is, "including but not limited to". The term "based on" is "at least partially based on". The term "one embodiment" represents "at least one embodiment"; the term "another embodiment" represents "at least one other embodiment"; and the term "some embodiments" represents "at least some embodiments". Relevant definitions of other terms will be given in the following descriptions.

It should be noted that concepts such as "first", "second" and the like as mentioned in the present disclosure are only used to distinguish apparatuses, modules or units, but not to define that these apparatuses, modules or units must be different apparatuses, modules or units, nor to define orders or interdependence of functions executed by these apparatuses, modules or units.

It should be noted that modifications of "one" and "a plurality of" as mentioned in the present disclosure are exemplary rather than restrictive. Those skilled in the art should understand that unless otherwise explicitly specified in the context, it should be understood as "one or more".

The names of messages or information exchanged between multiple apparatuses in the embodiments of the present disclosure are only for illustrative purposes, and are not intended to limit the scope of these messages or information.

Figure 1:
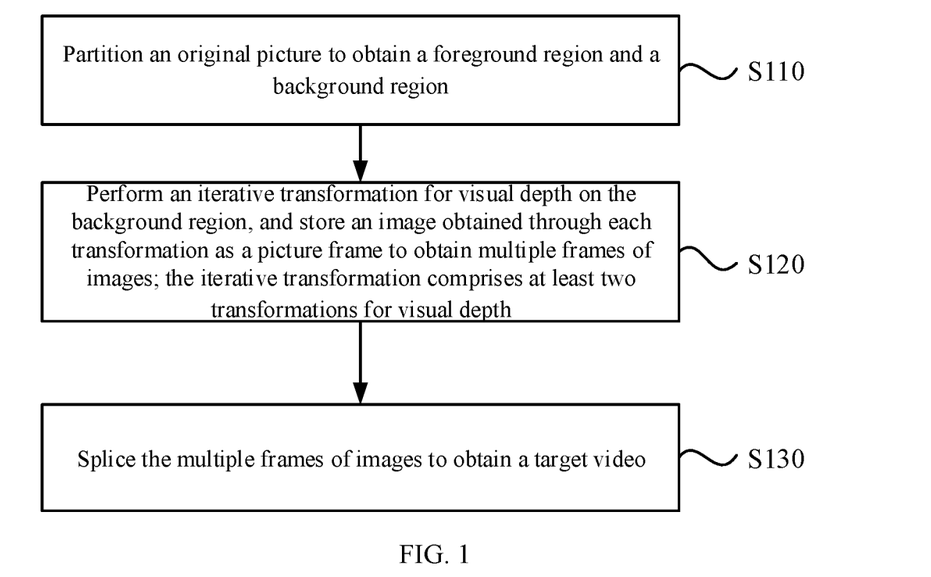
FIG. 1 is a flowchart of a method for converting a picture to a video in an embodiment of the present disclosure.

FIG. 1 is a flowchart of a method for converting a picture to a video provided by an embodiment of the present disclosure. This embodiment is applicable to a case of converting a static picture into a dynamic video. The method can be performed by an apparatus for converting a picture to a video, which can be composed of hardware and/or software, and can generally integrated into a device with a function of converting a picture to a video, where the device can be an electronic device such as a server or a server cluster. As shown in FIG. 1, the method specifically includes steps of:

Step 110: partitioning an original picture to obtain a foreground region and a background region.

The original picture may be a picture input or selected by a user. The foreground region is a region to be identified, such as a portrait region, an animal region, and a building region; and the background region is a remaining region except for the foreground region. Partitioning the original picture can be understood as dividing the foreground region and the background region.

In this embodiment, the mode of partitioning the original picture to obtain the foreground region and the background region may be: identifying a target object in the original picture; and partitioning by taking a region where the target object as the foreground region, to obtain the foreground region and the background region.

Specifically, an object identification model can be used to identify the target object in the original picture. For example, if the foreground image is a human portrait, the portrait identification model is used for identification, and if the foreground image is an animal, the animal identification model is used for identification. This embodiment does not limit a type of the identified target object. A region where the target object is located is cut out of the original picture, and the foreground region and the background region are separated to obtain the foreground region and the background region.

In this embodiment, the mode of partitioning by taking the region where the target object is located as the foreground region to obtain the foreground region and the background region may also be: obtaining a depth of a center point of the foreground region; and performing a depth smoothing process on pixels of the foreground region based on the depth of the center point, and performing an edge depth sharpening process on the background region and the foreground region, respectively, to obtain a processed foreground region and background region.

The method for obtaining the depth of a pixel may be a focusing method, a shading and illumination method, a relative depth or depth sorting method, and the like, and the method for obtaining the depth is not limited here. The process of performing depth smoothing on the pixels of the foreground region based on the depth of the center point can be understood as adjusting the depth of each pixel in the foreground region to the depth of the center point, so that the images of the foreground region are at the same visual depth.

Specifically, after the foreground region is partitioned, the depth smoothing process is performed on the pixels of the foreground region according to the depth of the center point of the foreground region, the depth sharpening process is performed on the edges, and discontinuous closed edges are obtained through the depth information, so as to cut out the foreground region, leaving the background region.

Step 120: performing an iterative transformation for visual depth on the background region, and storing an image obtained through each transformation as a picture frame to obtain multiple frames of images.

Wherein, the iterative transformation includes at least two transformations for the visual depth, and each transformation continues to perform the transformation of the visual depth based on a previous transformation result. The transformation of the visual depth includes the transformation from far to near or from near to far. The transformation for the visual depth can be understood as zooming the image. In this embodiment, a transformation range of the visual depth is first determined, and then within the transformation range, the iterative transformation of the visual depth is performed on the background region according to a certain step size.

In this embodiment, the iterative transformation for the visual depth on the background region may be: filling an image for a region in the background region where foreground is cut out, based on a preset machine learning model; and performing an iterative transformation for visual depth on the filled background region.

The preset machine learning model can be a model obtained by training a large number of samples, and the sample can be an image from which a part has been cut out, but is monitored and trained as a complete image. For example, the background region is a building. In the original picture, a part of the building is occluded by the foreground image. When the foreground region is cut out, the preset machine learning model is used to fill in the building image in the background region.

In this embodiment, the iterative transformation for the visual depth on the background region may be: transforming a depth of a pixel in the background region from near to far according to a first preset step size, based on the depth of the center point.

Specifically, based on the depth of the center point, the depth of the pixel in the background region is gradually increased. Exemplarily, if the step size is set to d, the visual depth becomes farther by d during the first transformation, to obtain the first frame of picture, and during the second transformation, the visual depth based on the first frame of picture continues to become farther by d, to obtain the second frame of picture, so that the depth of the second type of picture is 2 d with respect to the depth of the original picture, and so on, until multiple frames of pictures are obtained.

In this embodiment, the iterative transformation of the visual depth on the background region may be: transforming a depth of a pixel in the background region from far to near according to a second preset step size, based on the depth of the center point.

The second preset step size and the first preset step size may be the same or different. Specifically, based on the depth of the center point, the depth of the pixel in the background region is gradually reduced. Exemplarily, if the step size is set to d, the visual depth becomes closer by d during the first transformation, to obtain the first frame of picture, and during the second transformation, the visual depth based on the first frame of picture continues to become closer by d, to obtain the second frame of picture, so that the depth of the second type of picture is reduced by 2 d with respect to the depth of the original picture, and so on, until multiple frames of pictures are obtained.

Step 130: splicing the multiple frames of images to obtain a target video.

In this embodiment, the mode of splicing multiple frames of images may be splicing according to time stamps of the multiple frames of images. The spliced target video is an album with a Hitchcock effect.

Optionally, if there are at least two pieces of the original pictures, for each original picture, the original picture is partitioned to obtain the foreground region and the background region; an iterative transformation for visual depth is performed on the background region, and an image obtained through each transformation is stored as a picture frame to obtain multiple frames of images; the multiple frames of images are spliced to obtain a target video; and at least two target videos are obtained.

Optionally, after the at least two target videos are obtained, the following steps are further included: sorting the at least two target videos according to a preset order; splicing the sorted at least two target videos by adding a special transition effect between adjacent target videos; and rendering the spliced at least two target videos to obtain a final video.

Wherein, the preset order may be an order in which the pictures are input by the user, or an order adjusted by the user, which is not limited here. The preset transition effect between adjacent target videos can be the same or different. Setting the transmission effect can be pre-set or can be selected arbitrarily.

In the technical solution of this embodiment, an original picture is firstly partitioned to obtain a foreground region and a background region, then an iterative transformation for visual depth is performed on the background region, and an image obtained through each transformation is stored as a picture frame to obtain multiple frames of images, wherein the iterative transformation includes at least two transformations for visual depth, and finally the multiple frames of images are spliced to obtain a target video. In the method for converting a picture to a video provided by the embodiment of the present disclosure, multiple images produced by iteratively transforming the visual depth of the image in the background region are spliced, to obtain a video album with a focus of a foreground image and a Hitchcock transform effect of a background image without manual stop, which improves the convenience of album production.

The method for converting a picture to a video provided by the embodiment of the present disclosure can be launched as a feature of a video APP. This feature enables automatic editing, creation and sharing of videos. In this scenario, the user selects the picture to video function, the user selects a picture, the client uploads the picture to the server, the server obtains the picture uploaded by the client, and the picture generates a Hitchcock video clip and returns it to the client; the client decodes and clips the video, renders the picture, adds a transition effect and then previews it automatically. The user can share or post the video. The solution of the present application does not require the user to manually stop the video, but only needs to upload the picture, which greatly reduces the cost of generating the video from the picture.

Figure 2:
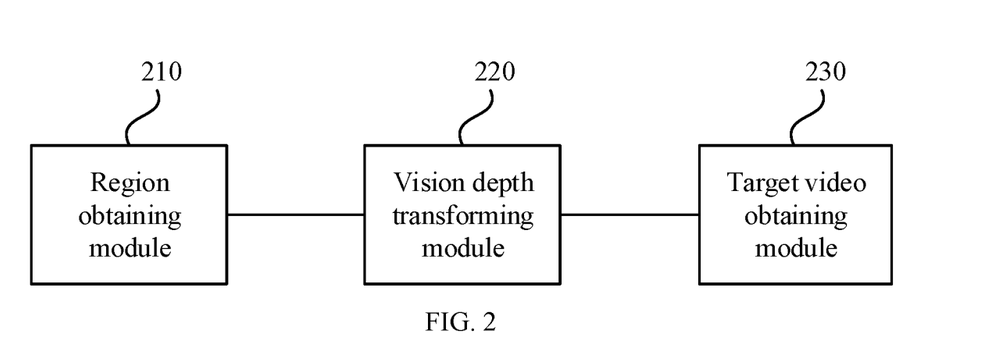
FIG. 2 is schematic structural diagram of an apparatus for converting a picture to a video in an embodiment of the present disclosure.

FIG. 2 is a schematic structural diagram of an apparatus for converting a picture to a video disclosed in an embodiment of the present disclosure. As shown in FIG. 2, the apparatus includes: a region obtaining module 210, a visual depth transforming module 220, and a target video obtaining module 230.

The region obtaining module 210 is configured to partition an original picture to obtain a foreground region and a background region;

The visual depth transforming module 220 is configured to perform an iterative transformation for visual depth on the background region, and store an image obtained through each transformation as a picture frame to obtain multiple frames of images; wherein, the iterative transformation comprises at least two transformations for visual depth;

The target video obtaining module 230 is configured to splice the multiple frames of images to obtain a target video.

Optionally, the region obtaining module 210 is further configured to:

identify a target object in the original picture; and partition by taking a region where the target object is located as the foreground region, to obtain the foreground region and the background region; wherein, the background region is a region other than the region where the target object is located in the original picture.

Optionally, the region obtaining module 210 is further configured to:

obtain a depth of a center point of the foreground region; and perform a depth smoothing process on pixels of the foreground region based on the depth of the center point, and perform an edge depth sharpening process on the background region and the foreground region, respectively, to obtain a processed foreground region and background region.

Optionally, the visual depth transforming module 220 is further configured to:

fill an image for a region in the background region where foreground is cut out, based on a preset machine learning model; and perform an iterative transformation for visual depth on the filled background region.

Optionally, the visual depth transforming module 220 is further configured to:

transform a depth of a pixel in the background region from near to far according to a first preset step size, based on the depth of the center point.

Optionally, the visual depth transforming module 220 is further configured to:

transform a depth of a pixel in the background region from far to near according to a second preset step size, based on the depth of the center point.

Optionally, the original picture is a picture input or selected by the user. If there are at least two pieces of the original pictures, for each original picture, the original picture is partitioned to obtain the foreground region and the background region; an iterative transformation for visual depth is performed on the background region, and an image obtained through each transformation is stored as a picture frame to obtain multiple frames of images; the multiple frames of images are spliced to obtain a target video; and at least two target videos are obtained.

Optionally, the apparatus further includes: a video splicing module, configured to:

sort the at least two target videos according to a preset order;

splice the sorted at least two target videos by adding a special transition effect between adjacent target videos; and render the spliced at least two target videos to obtain a final video.

The above-mentioned apparatus can execute the methods provided by all the foregoing embodiments of the present disclosure, and has corresponding functional modules and beneficial effects for executing the above-mentioned methods. For technical details not described in detail in this embodiment, reference may be made to the methods provided by all the foregoing embodiments of the present disclosure.

Figure 3:
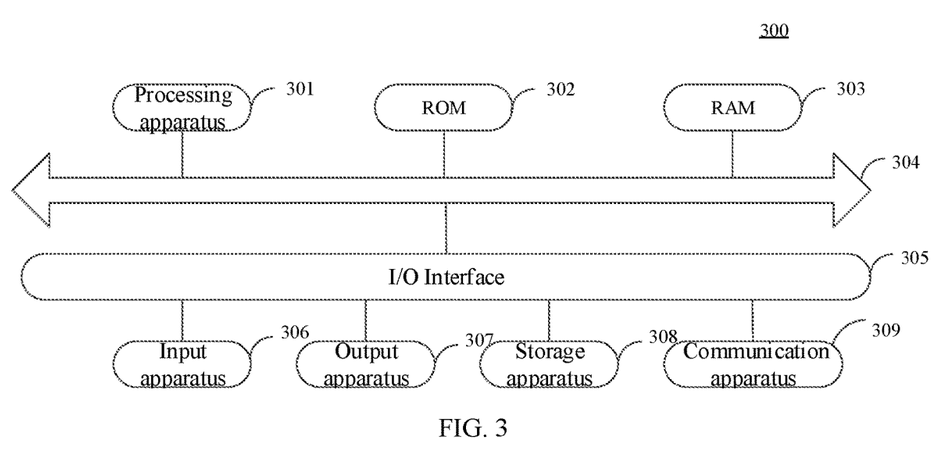
FIG. 3 is a schematic structural diagram of an electronic device in an embodiment of the present disclosure.

Referring to FIG. 3, it shows a schematic structural diagram of an electronic device 300 applicable to implementing an embodiment of the present disclosure. The electronic device in the embodiment of the present disclosure may include, but are not limited to, mobile terminals such as a mobile phone, a laptop, a digital broadcast receiver, a PDA (Personal Digital Assistant), a PAD (tablet computer), a PMP (Portable Multimedia Player), in-vehicle terminal (e.g., in-vehicle navigation terminal), etc., and stationary terminals such as a digital TV, a desktop computer, etc., or various forms of servers, such as a standalone server or a server cluster. The electronic device shown in FIG. 3 is only an example, and should not impose any limitation on the function and scope of use of the embodiment of the present disclosure.

As illustrated in FIG. 3, the electronic device 300 may include a processing apparatus 301 (e.g., a central processing unit, a graphics processing unit, etc.), which can perform various suitable actions and processing according to a program stored in a read-only memory (ROM) 302 or a program loaded from a storage apparatus 308 into a random-access memory (RAM) 303. The RAM 303 further stores various programs and data required for operations of the electronic device 300. The processing apparatus 301, the ROM 302, and the RAM 303 are interconnected by means of a bus 304. An input/output (I/O) interface 305 is also connected to the bus 304.

Usually, the following apparatus may be connected to the I/O interface 305: an input apparatus 306 including, for example, a touch screen, a touch pad, a keyboard, a mouse, a camera, a microphone, an accelerometer, a gyroscope, or the like; an output apparatus 307 including, for example, a liquid crystal display (LCD), a loudspeaker, a vibrator, or the like; a storage apparatus 308 including, for example, a magnetic tape, a hard disk, or the like; and a communication apparatus 309. The communication apparatus 309 may allow the electronic device 300 to be in wireless or wired communication with other devices to exchange data. While FIG. 3 illustrates the electronic device 300 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 309 and installed, or may be installed from the storage apparatus 308, or may be installed from the ROM 302. When the computer program is executed by the processing apparatus 301, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) or the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: partition an original picture to obtain a foreground region and a background region; perform an iterative transformation for visual depth on the background region, and storing an image obtained through each transformation as a picture frame to obtain multiple frames of images, the iterative transformation including at least two transformations for visual depth; and splice the multiple frames of images to obtain a target video.

The computer program codes for performing the operations of the present disclosure may be written in one or more programming languages or a combination thereof. The above-mentioned programming languages include object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved described in the embodiments of the present disclosure can be implemented by software or hardware. In some cases, the name of a unit does not constitute a restriction on the unit itself.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, the embodiments of the present disclosure provide a method for converting a picture into a video. The method includes:

partitioning an original picture to obtain a foreground region and a background region;

performing an iterative transformation for visual depth on the background region, and storing an image obtained through each transformation as a picture frame to obtain multiple frames of images; wherein the iterative transformation comprises at least two transformations for visual depth; and splicing the multiple frames of images to obtain a target video.

Further, the partitioning an original picture to obtain a foreground region and a background region, comprises:

identifying a target object in the original picture; and partitioning by taking a region where the target object is located as the foreground region, to obtain the foreground region and the background region; wherein the background region is a region in the original picture except for the region where the target object is located.

Further, the partitioning by taking a region where the target object is located as the foreground region, to obtain the foreground region and the background region, comprises:

obtaining a depth of a center point of the foreground region; and performing a depth smoothing process on pixels of the foreground region based on the depth of the center point, and performing an edge depth sharpening process on the background region and the foreground region respectively to obtain a processed foreground region and background region.

Further, the performing an iterative transformation for visual depth on the background region, comprises:

filling an image for a region in the background region where a foreground is cut out, based on a machine learning model which is preset; and performing the iterative transformation for visual depth on the filled background region.

Further, the performing an iterative transformation for visual depth on the background region, comprises:

transforming a depth of a pixel in the background region from near to far according to a first preset step size, based on the depth of the center point.

Further, the performing an iterative transformation for visual depth on the background region, comprises:

transforming a depth of a pixel in the background region from far to near according to a second preset step size, based on the depth of the center point.

Further, the original picture is a picture which is input or selected by a user. In the case that there are at least two pieces of the original pictures, for each original picture, the original picture is partitioned to obtain the foreground region and the background region; the iterative transformation for visual depth is performed on the background region, and the image obtained through each transformation is stored as the picture frame to obtain the multiple frames of images; the multiple frames of images are spliced to obtain the target video; and at least two target videos are obtained;

after the at least two target videos are obtained, the method further comprises:

sorting the at least two target videos according to a preset order;

splicing the at least two target videos which are sorted by adding a special transition effect between adjacent target videos; and rendering the at least two target videos which are spliced to obtain a final video.

Further, the foreground region comprises a portrait region.

Note that the above descriptions are only alternative embodiments of the present disclosure and applied technical principles. Those skilled in the art will understand that the present disclosure is not limited to the specific embodiments described herein, and various obvious changes, readjustments, and substitutions can be made by those skilled in the art without departing from the scope of the present disclosure. Therefore, although the present disclosure has been explained in detail through the above embodiments, the present disclosure is not limited to the above embodiments, but may include many other equivalent embodiments without departing from the concept of the present disclosure, and the scope of the present disclosure is determined by the scope of the appended claims.

The invention claimed is:

1. A method for converting a picture into a video, comprising:

partitioning an original picture to obtain a foreground region and a background region;

performing an iterative transformation for visual depth on the background region, and storing an image obtained through each transformation as a picture frame to obtain multiple frames of images; wherein the iterative transformation comprises at least two transformations for visual depth; and splicing the multiple frames of images to obtain a target video, wherein the partitioning an original picture to obtain a foreground region and a background region, comprises:

identifying a target object in the original picture; and partitioning by taking a region where the target object is located as the foreground region, to obtain the foreground region and the background region; wherein the background region is a region in the original picture except for the region where the target object is located, and wherein the partitioning by taking a region where the target object is located as the foreground region, to obtain the foreground region and the background region, comprises:

obtaining a depth of a center point of the foreground region; and performing a depth smoothing process on pixels of the foreground region based on the depth of the center point, and performing an edge depth sharpening process on the background region and the foreground region respectively to obtain a processed foreground region and background region.

2. The method according to claim 1, wherein the performing an iterative transformation for visual depth on the background region, comprises:

filling an image for a region in the background region where a foreground is cut out, based on a machine learning model which is preset; and performing the iterative transformation for visual depth on the filled background region.

3. The method according to claim 1, wherein the performing an iterative transformation for visual depth on the background region, comprises:

transforming a depth of a pixel in the background region from near to far according to a first preset step size, based on the depth of the center point.

4. The method according to claim 1, wherein the performing an iterative transformation for visual depth on the background region, comprises:

transforming a depth of a pixel in the background region from far to near according to a second preset step size, based on the depth of the center point.

5. The method according to claim 1, wherein the original picture is a picture which is input or selected by a user;

wherein, in a case that there are at least two pieces of the original pictures, for each original picture, the original picture is partitioned to obtain the foreground region and the background region; the iterative transformation for visual depth is performed on the background region, and the image obtained through each transformation is stored as the picture frame to obtain the multiple frames of images; the multiple frames of images are spliced to obtain the target video; and at least two target videos are obtained;

after the at least two target videos are obtained, the method further comprises:

sorting the at least two target videos according to a preset order;

splicing the at least two target videos which are sorted by adding a special transition effect between adjacent target videos; and rendering the at least two target videos which are spliced to obtain a final video.

6. The method according to claim 1, wherein the foreground region comprises a portrait region.

7. An apparatus for converting a picture into a video, comprising:

a region obtaining module, configured to partition an original picture to obtain a foreground region and a background region;

a visual depth transforming module, configured to perform an iterative transformation for visual depth on the background region, and store an image obtained through each transformation as a picture frame to obtain multiple frames of images; wherein the iterative transformation comprises at least two transformations for visual depth; and a target video obtaining module, configured to splice the multiple frames of images to obtain a target video, wherein the region obtaining module is further configured to:

identify a target object in the original picture; and partition by taking a region where the target object is located as the foreground region, to obtain the foreground region and the background region; wherein the background region is a region in the original picture except for the region where the target object is located, and wherein the region obtaining module is further configured to:

obtain a depth of a center point of the foreground region; and perform a depth smoothing process on pixels of the foreground region based on the depth of the center point, and perform an edge depth sharpening process on the background region and the foreground region respectively to obtain a processed foreground region and background region.

8. An electronic device, comprising:

one or more processing apparatuses;

a storage apparatus, configured to store one or more instructions;

wherein the one or more instructions, when executed by the one or more processing apparatuses, cause the one or more processing apparatuses to implement the method for converting a picture into a video according to claim 1.

9. A non-transitory computer-readable storage medium, storing a computer program thereon, wherein the program, when executed by a processing apparatus, implements the method for converting a picture into a video according to claim 1.

10. The apparatus according to claim 7, wherein the visual depth transforming module is further configured to:

fill an image for a region in the background region where a foreground is cut out, based on a machine learning model which is preset; and perform the iterative transformation for visual depth on the filled background region.

11. The apparatus according to claim 7, wherein the visual depth transforming module is further configured to:

transform a depth of a pixel in the background region from near to far according to a first preset step size, based on the depth of the center point.

12. The apparatus according to claim 7, wherein the visual depth transforming module is further configured to:

transform a depth of a pixel in the background region from far to near according to a second preset step size, based on the depth of the center point.

13. The apparatus according to claim 7, wherein the foreground region comprises a portrait region.

14. The method according to claim 1, wherein the original picture is a picture which is input or selected by a user;

wherein, in a case that there are at least two pieces of the original pictures, for each original picture, the original picture is partitioned to obtain the foreground region and the background region; the iterative transformation for visual depth is performed on the background region, and the image obtained through each transformation is stored as the picture frame to obtain the multiple frames of images; the multiple frames of images are spliced to obtain the target video; and at least two target videos are obtained;

after the at least two target videos are obtained, the method further comprising:

sorting the at least two target videos according to a preset order;

splicing the at least two target videos which are sorted by adding a special transition effect between adjacent target videos; and rendering the at least two target videos which are spliced to obtain a final video.

15. The method according to claim 1, wherein the foreground region comprises a portrait region.

16. The method according to claim 1, wherein the original picture is a picture which is input or selected by a user;

wherein, in a case that there are at least two pieces of the original pictures, for each original picture, the original picture is partitioned to obtain the foreground region and the background region; the iterative transformation for visual depth is performed on the background region, and the image obtained through each transformation is stored as the picture frame to obtain the multiple frames of images; the multiple frames of images are spliced to obtain the target video;

and at least two target videos are obtained;

after the at least two target videos are obtained, the method further comprising:

sorting the at least two target videos according to a preset order;

splicing the at least two target videos which are sorted by adding a special transition effect between adjacent target videos; and rendering the at least two target videos which are spliced to obtain a final video.

17. The method according to claim 1, wherein the foreground region comprises a portrait region.

* * * * *